United States Patent [19]
Weakley

[11] Patent Number: 5,687,766
[45] Date of Patent: Nov. 18, 1997

[54] APPARATUS FOR FORMING A VORTEX

[75] Inventor: Todd S. Weakley, Waterford, Mich.

[73] Assignee: B. W. Vortex, Inc., Livonia, Mich.

[21] Appl. No.: 588,460

[22] Filed: Jan. 18, 1996

[51] Int. Cl.$^6$ ............................................. F15C 1/16
[52] U.S. Cl. ..................................... 137/812; 137/810
[58] Field of Search ............................. 137/810, 812

[56] References Cited

U.S. PATENT DOCUMENTS

| | | | |
|---|---|---|---|
| 3,324,891 | 6/1967 | Rhoades | 137/812 |
| 3,343,790 | 9/1967 | Bowles | 137/812 |
| 3,782,791 | 1/1974 | Neumann et al. | 308/9 |
| 4,004,349 | 1/1977 | Neumann | 34/10 |
| 4,098,568 | 7/1978 | Neumann | 432/230 |
| 4,112,977 | 9/1978 | Syred et al. | 137/812 |
| 4,144,021 | 3/1979 | Neumann | 432/58 |
| 4,259,988 | 4/1981 | Singh | 137/812 |
| 4,365,915 | 12/1982 | Neumann | 406/88 |
| 4,632,574 | 12/1986 | Wilson et al. | 65/182.2 |
| 5,188,135 | 2/1993 | Neumann et al. | 134/64 R |
| 5,198,028 | 3/1993 | Nakano et al. | |

*Primary Examiner*—A. Michael Chambers
*Attorney, Agent, or Firm*—Bliss McGlynn, P.C.

[57] ABSTRACT

An apparatus for forming a vortex wherein the vortex is typically formed of a fluid injected into a cavity formed in a cup-shaped member. The interior surface of the cup is formed of two discreet sections, a cylindrical section and a hemispherical section. An inlet port provides an ingress for fluid into the cavity. The fluid strikes the hemispherical surface upon entering the cavity and is redirected or diffused such that the fluid forms a vortex. The cylindrical section aids to stabilize the vortex enabling the vortex to extend above the surface of the cup-shaped member prior to degenerating.

20 Claims, 3 Drawing Sheets

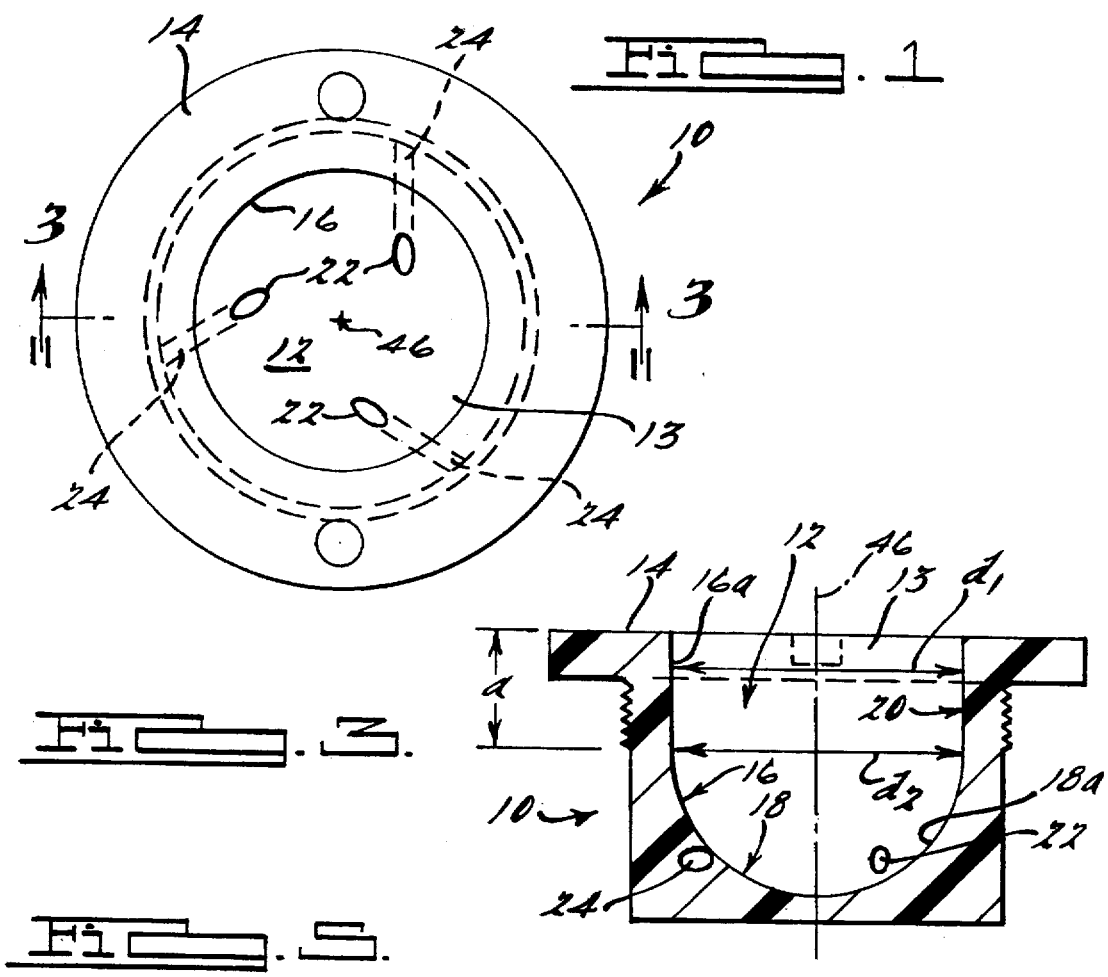
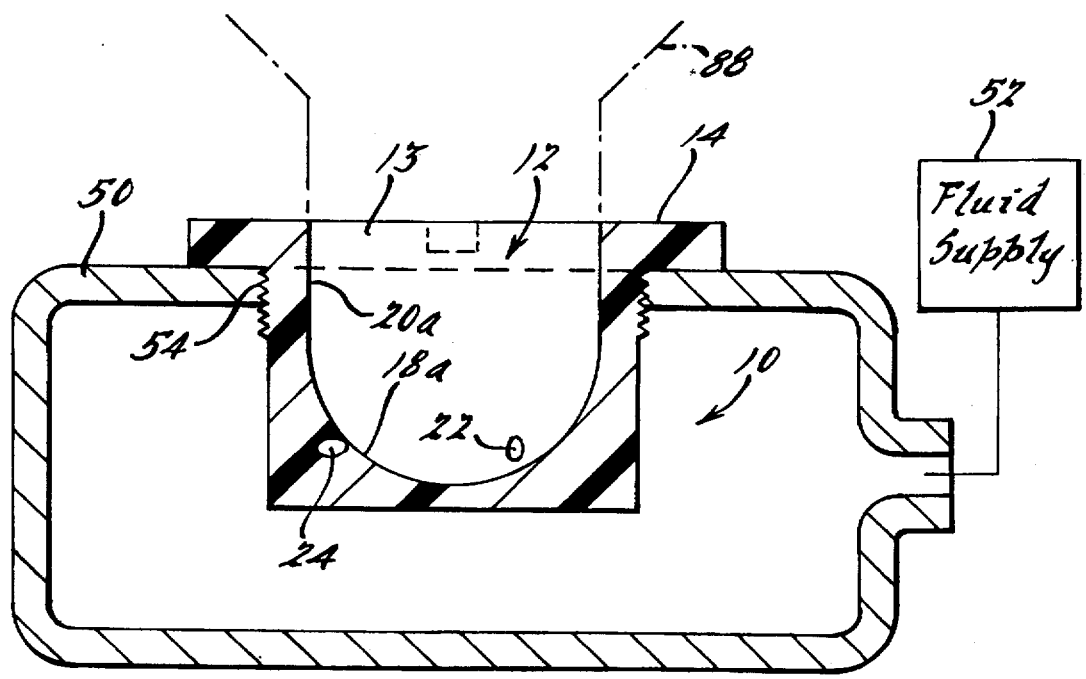

APPARATUS FOR FORMING A VORTEX

BACKGROUND OF THE INVENTION

1. Field of the Invention

The invention relates to an apparatus for use in forming a vortex. More specifically, an apparatus for transforming a stream of fluid into a vortex.

2. Description of the Related Art

Use of a vortex for performing work on a workpiece is known. Specifically, U.S. Pat. No. 3,782,791 shows a member having a cavity therein wherein fluid discharged from the base of the cavity exits through an opening at the surface of the member in the form of a vortex. As indicated in U.S. Pat. No. 3,782,791, the vortex may be used for a plurality of functions, the primary purpose set forth therein being to provide a cushion or support for transporting products.

While several different embodiments of an apparatus for forming a vortex are illustrated in U.S. Pat. No. 3,782,791, each design utilizes the same basic principle; i.e., the fluid, typically water, enters at the base of the cavity, strikes the side walls of the cavity and is caused to rotate in a circular motion to form a vortex. The vortex exits through the opening in the surface due to a continuous supply of fluid as additional fluid added to the cavity causes a corresponding mount of fluid to exit at the surface of the member.

Upon exiting the cavity, the vortex profile begins to dissipate such that the diameter of the vortex begins to increase immediately upon exiting the cavity. As the rotational speed of the vortex increases, the more rapid the dissipation or degeneration of the vortex. The greater the axial distance of the vortex from the cavity, the weaker the vortex in terms of rotational energy.

It is an object of the present invention to form a vortex which is able to retain its pattern or shape at an increased distance from the cavity opening or outer surface of the member. Increasing the vertical height of the vortex; i.e., the distance it extends above the surface of the member, while still maintaining its profile results in an optimum vortex in terms of work producing efficiency.

SUMMARY OF THE INVENTION

Accordingly, the present invention is a unique apparatus for forming a fluid vortex. In general, the apparatus includes a member having a cavity therein. An inlet port provides an ingress for a fluid to enter the cavity and form the vortex. The cavity is shaped such that it includes two sections, an arcuate section and a straight section. The inlet port communicates with the arcuate section. The straight section is positioned adjacent the arcuate section and extends to the surface of said member forming a cavity opening through which the vortex exits. The arcuate section redirects the fluid entering the cavity such that it has two components, a horizontal component which causes rotation of the fluid within the cavity, and a vertical component which imparts a lifting force to urge the vortex outward through the cavity opening.

One advantage of the present invention is that the vortex extends above the surface of the member and maintains its profile pattern at a distance greater than the previous designs. Maintaining the vortex profile enables it to be used for performing work in areas where the tolerance; i.e., the distance from the surface to a workpiece is difficult to maintain. Thus, it is not as necessary to pass a workpiece as close to the surface of the member for forming a vortex as was necessary with the prior art.

BRIEF DESCRIPTION OF THE DRAWINGS

FIG. 1 is a top view of an apparatus for forming a vortex according to the present invention.

FIG. 3 is a sectional view taken along 3—3 of FIG. 1.

FIG. 5 is a sectional view of an apparatus for forming a vortex as illustrated in FIG. 1 used in connection with a fluid supply.

FIG. 6 is a top view of a plurality of members for forming a vortex for use in a blank washer assembly.

DESCRIPTION OF THE PREFERRED EMBODIMENT(S)

Figure 2:
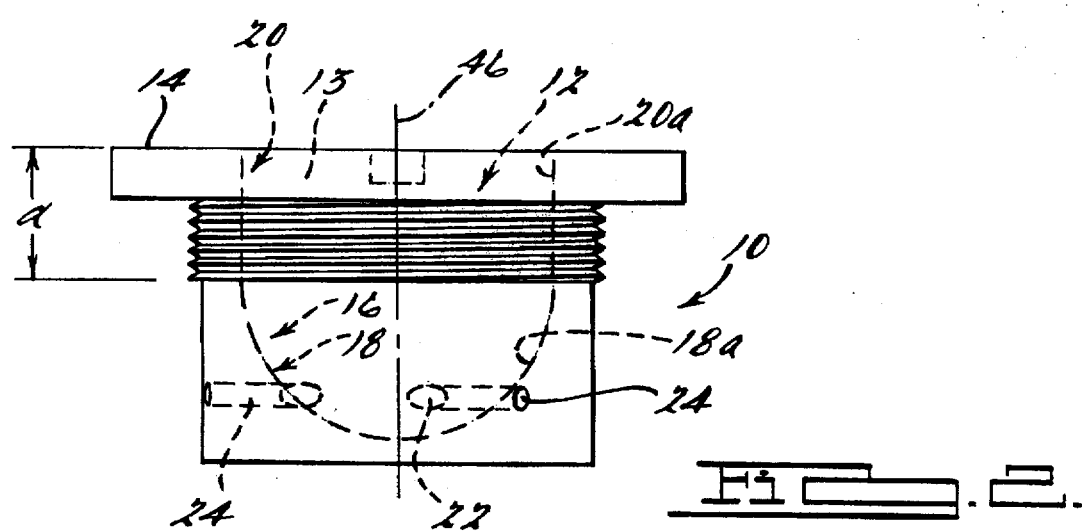
FIG. 2 is a side view of the apparatus for forming a vortex of FIG. 1.

FIGS. 1 and 2 illustrate an apparatus for forming a vortex according to the present invention. As shown therein, the apparatus includes a member 10 having a cavity 12 formed therein. The cavity 12 communicates with an outer surface 14 of the member 10 through an opening 13.

The cavity 12 defines an interior surface 16 of the member 10. The surface 16 includes a diffuser surface 18 and a stabilizer surface 20. The diffuser and stabilizer surfaces 18, 20 are positioned such that a vortex formed by fluid entering the cavity 12 through an inlet port 22 and striking the diffuser surface 18 is stabilized by the stabilizer surface 20 prior to exiting the cavity 12 through the opening 13. As shown in FIG. 2, the member 10 is substantially cup-shaped wherein the diffuser surface 18 is an arcuate surface 18a and the stabilizer surface 20 is a linear surface 20a. In one embodiment, the arcuate surface 18a is a hemispherical surface and the linear surface 20a is a cylindrical surface. While the arcuate surface 18a is shown as a hemispherical surface, a paraboloidal surface may also be used. Use of a paraboloidal surface enables the surface contour of the diffuser surface 18 to be varied depending upon the desired amount of rotational energy versus lift energy. For certain uses, it may be desired to increase either the rotational or the lift component and corresponding energy of the resultant vortex.

As shown in FIG. 2, the cylindrical surface is positioned adjacent the hemispherical surface. Inlet ports 22 are positioned to allow a fluid to enter the cavity 12 adjacent the hemispherical surface. Referring to FIG. 1, the inlet ports 22 are formed by the intersection of inlet passageways 24 and the hemispherical surface. The inlet passageways 24 are positioned such that they are tangential to the hemispherical surface; i.e., the outer surface of the inlet passageway 24 is positioned adjacent the hemispherical surface of the cavity 12. FIG. 1 illustrates that such an arrangement results in an oblong or oval-shaped port 22. Further, the inlet passageway 24 is substantially parallel with the outer surface 14 of the member 10, thus no vertical or upward component of force is delivered to the vortex by the fluid entering the cavity 12 through the passageway 24. The passageways 24 are shown substantially parallel with the outer surface 14, as such an orientation acts to balance the rotational energy and the lift energy. However, the passageways 24 may also be positioned at an angle, with respect to the outer surface 14, to provide a change or variation between the lifting force or component and the rotational force or component of the vortex depending upon the ratio of lift energy to rotational energy desired.

Figure 7:
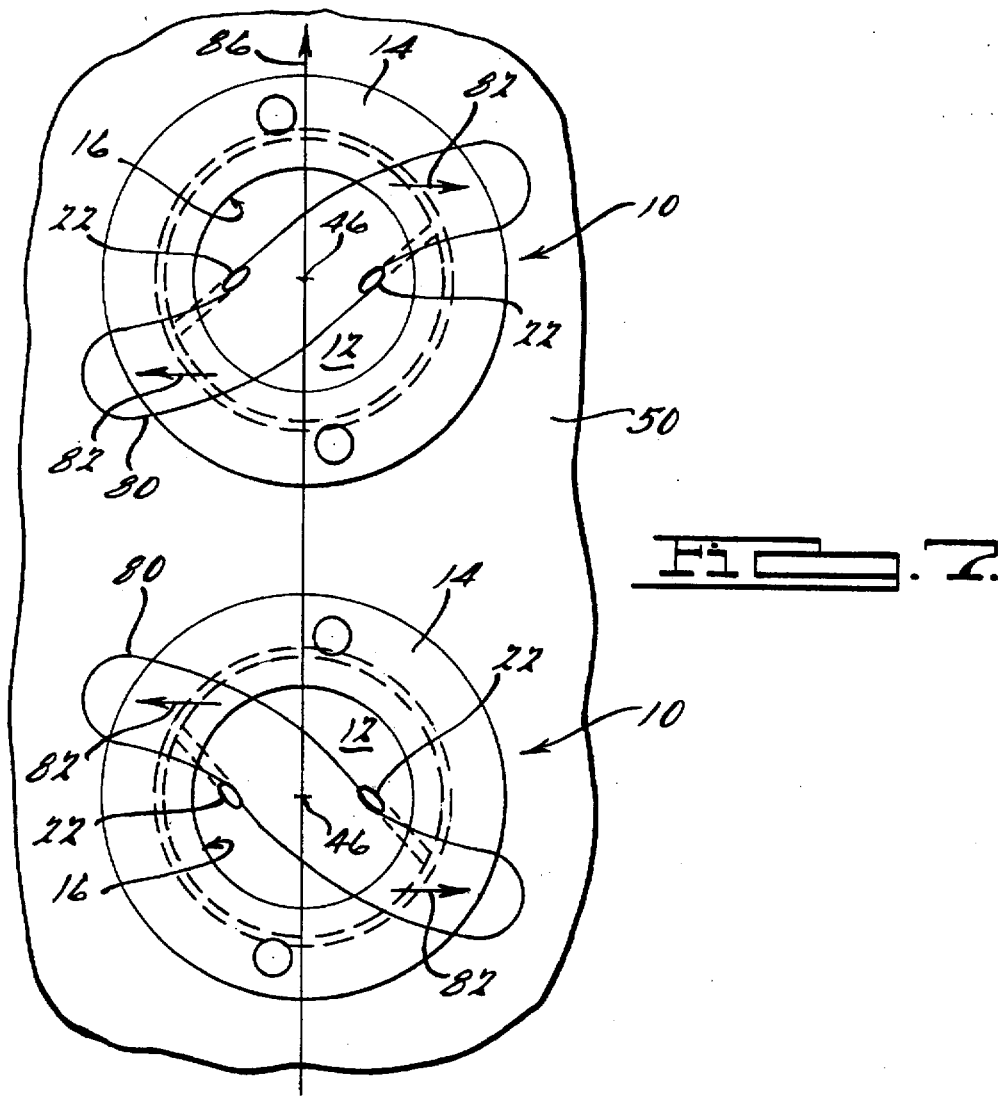
FIG. 7 is a transverse cross-sectional view of a vortex created according to one embodiment of the present invention.
Figure 8:
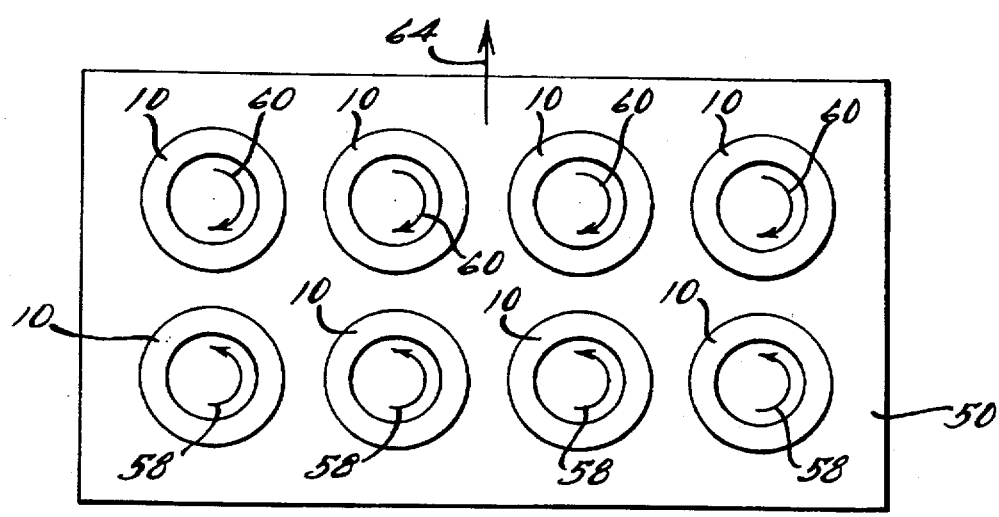

While the disclosed embodiment shows three passageways 24 forming three discreet inlet ports 22, a greater or lesser number of passageways 24 and corresponding inlet ports 22 may also be used. Use of three or more inlet ports 22 generally results in a vortex having a circular shape in a section transverse the centerline or rotational axis of the vortex. Use of additional inlet ports; i.e., more than three, act to further define and round out the circular cross-section. Use of two inlet ports 22 results in a transverse cross-section as shown in FIG. 7.

The cross-sectional sphere or pattern approximates two elliptical or kidney-shaped configurations 80 disposed about the centerline 46 or rotational axis of the cavity. Such a pattern results in maximum rotational energy illustrated by arrows 82 at the outer edge in parallel and opposite directions when the inlet ports 22 are positioned diametrically.

A vortex exhibiting a cross-sectional profile set forth above may be used in a blank or steel strip washing operation. In particular, the vortex provides a washing force in a direction transverse the direction of movement shown by line 86 of the steel strip or blank. Such a vortex reduces the forces occurring both in and opposing the direction of travel 80 of the blank or steel strip, which can cause streaking or improper cleaning.

Figure 4:
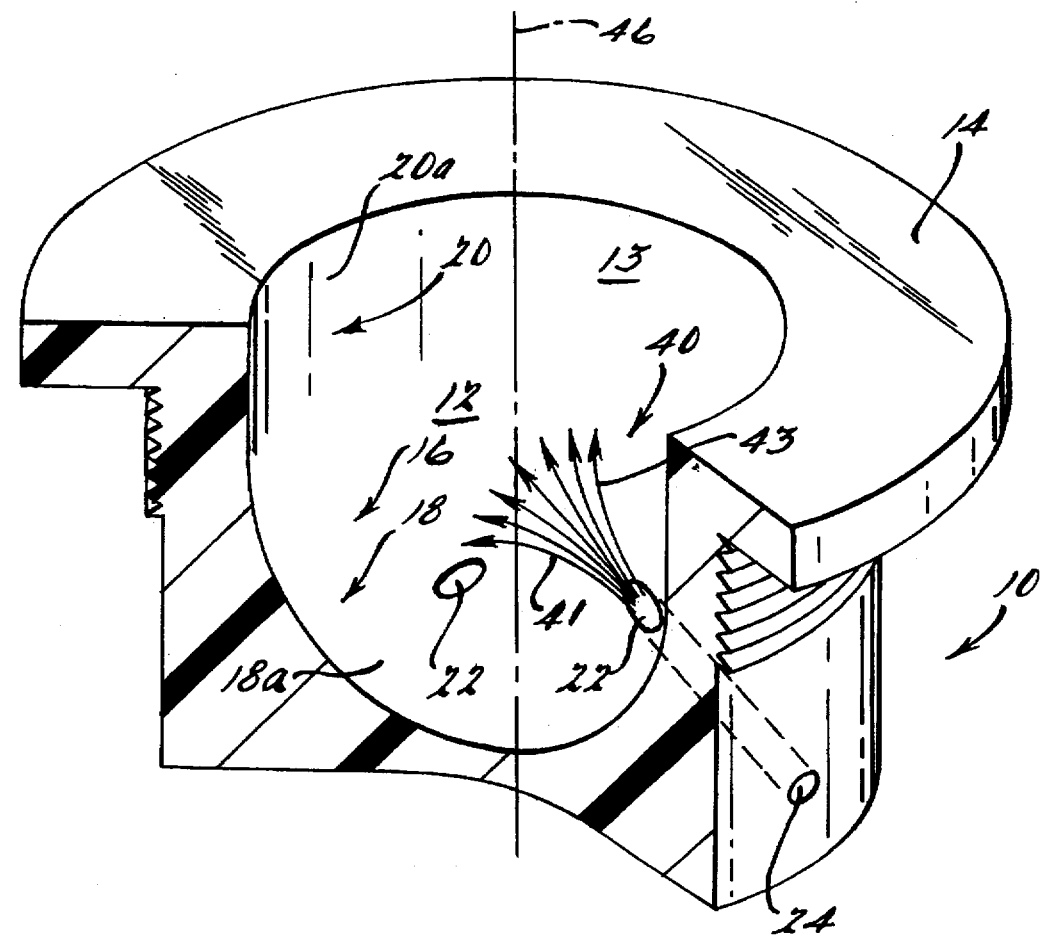
FIG. 4 is a perspective view of the apparatus for forming a vortex of FIG. 1 with portions removed for clarity.

Upon entry of the fluid into the cavity 12, the fluid flows along the hemispherical surface which diffuses the fluid into a fan-type pattern 40 (see FIG. 4); i.e., the fluid fans out against the hemispherical surface such that a portion of the fluid has a lifting outward component which acts to lift the vortex. Thus, the hemispherical surface directs the fluid in a direction having two force components, a vertical component which acts to lift the vortex upward and out of the cavity 12 and a horizontal component which provides a rotational force for creating rotational movement of the fluid within the cavity 12 to develop the vortex. The vertical component is parallel the centerline or rotational axis 46 of the cavity 12. The vortex rotates about the centerline 46. As shown, the inner edge 41 of the fluid stream exiting the inlet ports 22 closest to the centerline 46, produces the maximum rotational force and the outer edge 43, furthest from the centerline 46 produces the maximum lifting force.

The stabilizer surface 20 is shown herein in the preferred embodiment as a cylindrical surface which acts to stabilize the upward or vertical force component of the vortex. Placing the cylindrical surface adjacent the hemispherical surface enables the vortex formed within the cavity to stabilize to hold its shape above the upper surface of the cavity 12. Such an arrangement results in a vortex which extends a greater distance from the surface of the cavity 12 such that the scrubbing or rotational energy also extends a greater distance above the cavity 12. As indicated by the dashed lines 88 in FIG. 5, the vortex extends and retains its pattern above the outer surface 14 of the member 10. The vortex does not begin to dissipate; i.e., increase in diameter, immediately upon exiting the cavity 12. This provides greater clearance between a workpiece (not shown) and the member 10. As shown in FIG. 3, the diameter ($d_1$) of the cylindrical surface of the cavity 12 is identical to the diameter ($d_2$) of the hemispherical surface. The axial length (a) of the cylindrical surface along the centerline 46 is approximately three-fourths of the diameter ($d_2$) of the hemispherical surface. It has been found that such a length will stabilize the vortex created by the hemispherical surface. Increasing the length (a) of the stabilizer surface 20 while slightly increasing the overall stabilizing function reduces the rotational energy of the vortex. Thus, any additional advantage gained by increasing the axial length (a) of the stabilizing section is outweighed by the resultant rotational energy loss.

In use, fluid is supplied to the inlet ports 22 through the passageways 24 in a conventional manner; i.e., the member 10 is connected to a plenum 50 into which fluid from a fluid supply 52 is pumped. Fluid enters the passageways 24 and is emitted through the inlet ports 22 at a continuous pressure and rate. As shown in FIG. 5, the member 10 has threaded sides 54 enabling it to be screwed into the plenum 50 for easy assembly of a plenum 50 having a plurality of members 10 for forming a vortex. Additionally, by threading the members 10, they may be easily changed or removed for maintenance purposes.

While the members 10 are shown connected to the plenum 50 via threaded sides 54, the members 10 may also be connected by fasteners extending downward through the outer surface 14 and into the plenum 50. Additionally, the members 10 may be held in place by a hold down plate which fits over and covers the members 10. Members 10, according to the present invention, are useful in assembling a vortex rail for use in a steel blank or continuous steel strip washer application or apparatus, the type of which is disclosed in U.S. Pat. No. 5,188,135, the disclosure of which is hereby incorporated herein by reference. Thus, use of an apparatus for creating a vortex according to the present invention in a blank washer apparatus results in a greater distance or separation between the upper and lower vortex plenums which increases the range of tolerance; i.e., an increase in the degree of warped or bent material which may be run through the washer.

Finally, the members 10 may be modified to create a vortex which rotates in either a clockwise or a counterclockwise direction by simply changing the direction or orientation of the passageways 24. FIG. 6 illustrates two rows of members 10 for creating vortexes. The lower row has passageways 24 and inlet ports 22 which form vortexes which rotate in a counterclockwise direction (see arrows 58). The upper row is arranged such that vortexes are created which rotate in a clockwise direction (see arrows 60). By orientating respective adjacent vortexes in such a rotational pattern, a side fluid flow in the direction shown by the arrow 62 in FIG. 6 results which when used in a blank or continuous strip washing application acts to sweep or flush dirt or other foreign material from a workpiece moving across the vortex rail in the direction shown by the arrow 64. A second pair of rows of members 10 may also be added to the vortex manifold 50 shown in FIG. 6. When added, the second pair are positioned such that their centers are offset or staggered with respect to the centers of the first pair of rows, to provide additional coverage of the blank or steel strip.

It should be appreciated that a vortex created by the apparatus according to the present invention creates a vortex which extends at a greater distance from the surface of the apparatus for creating a vortex than those vortexes created through the prior art.

What is claimed is:

1. An apparatus for forming a vortex comprising:
    a member having a cavity therein, said member including an outer surface wherein said cavity communicates with said outer surface to form an opening, such that said vortex is formed within said cavity and exits said cavity through said opening;

said cavity further defining a surface and said member having a passageway therein, wherein said passageway intersects with said surface to form an inlet port at the intersection of said surface and said passageway;

said surface of said cavity including a diffuser surface and a stabilizer surface, said stabilizer surface positioned adjacent said diffuser surface such that said vortex is formed by contact of a fluid with said diffuser surface and is stabilized by said stabilizer surface prior to exiting the cavity through the opening adjacent said outer surface; and said cavity having a central axis, said vortex formed about said central axis, a cross-sectional shape of said cavity taken along a plane encompassing said central axis is such that the diffuser surface is arcuate and the stabilizer surface is linear and parallel said central axis.

2. An apparatus for forming a vortex as set forth in claim 1 wherein said fluid enters through said inlet port in a direction tangent the surface of the diffuser section.

3. An apparatus for forming a vortex as set forth in claim 1 wherein said diffuser surface is a concave surface.

4. An apparatus for forming a vortex as set forth in claim 1 wherein said diffuser surface is a hemispherical surface.

5. An apparatus for forming a vortex as set forth in claim 1 wherein said diffuser surface is a paraboloidal surface.

6. An apparatus for forming a vortex as set forth in claim 1 wherein said inlet port is formed in said diffuser surface.

7. An apparatus for forming a vortex according to claim 1 wherein said stabilizer surface is cylindrical and said diffuser surface is hemispherical.

8. An apparatus for forming a vortex as set forth in claim 7 wherein said passageway supplies fluid to said diffuser surface in a tangential direction relative to said hemispherical diffuser surface.

9. An apparatus for forming a vortex as set forth in claim 7 wherein said cylindrical section is positioned between said hemispherical section and said opening such that the vortex formed in said hemispherical section passes through said cylindrical section prior to exiting said cup.

10. A method for forming a vortex comprising:

directing a fluid into a member having a cavity therein, said fluid entering said cavity and striking an arcuate diffuser surface;

said arcuate diffuser surface redirecting the flow of said fluid to include a rotational component and an axial component wherein said arcuate diffuser surface redirects said fluid to form a fluid vortex;

passing said fluid vortex through a stabilizer surface positioned adjacent said arcuate diffuser surface, said stabilizer surface acting on said vortex in a manner such that degeneration of said vortex upon exiting said cavity is reduced.

11. A method for forming a fluid vortex as set forth in claim 10 wherein said diffuser surface is a hemispherical surface and said stabilizer surface is a cylindrical surface.

12. An apparatus for forming a vortex comprising:

a member having a cavity therein, said cavity including an opening communicating with an outer surface of said member, said cavity having a diffuser section including an arcuate surface which forms a fluid emitted from an inlet pen and striking the arcuate surface into a vortex; and a separate stabilizer section having a surface parallel a central axis of the cavity positioned adjacent said diffuser section wherein said vortex formed in said diffuser section travels through said stabilizer section prior to exiting said cavity through said opening.

13. An apparatus for forming a vortex as set forth in claim 12 wherein said arcuate surface is a hemispherical surface.

14. An apparatus for forming a vortex according to claim 13 wherein the fluid emitted from said inlet port is emitted in a direction tangential to the hemispherical surface.

15. An apparatus for forming a vortex as set forth in claim 13 wherein said hemispherical surface redirects the flow of fluid entering said cavity through said inlet port in both an axial and a transverse direction with respect to said central axis.

16. An apparatus for forming a vortex comprising:

a cup, said cup having a cavity formed of a cylindrical surface and hemispherical surface;

a passageway positioned tangential to said hemispherical surface wherein said passageway terminates at said hemispherical surface forming an inlet port opening into said hemispherical surface, said inlet port forming an ingress for a fluid which upon striking said hemispherical surface swirls about in said cavity to form a fluid vortex.

17. An apparatus for forming a vortex as set forth in claim 16 wherein said cylindrical surface is positioned between said hemispherical surface and said opening such that the vortex formed by said hemispherical surface passes through said cylindrical surface prior to exiting said cavity.

18. An apparatus for forming a vortex as set forth in claim 16 wherein said cavity has a central axis and said cylindrical surface has a longitudinal axis coincident with the central axis of said cavity wherein both axes pass through a pole of said hemispherical surface.

19. An apparatus for forming a vortex as set forth in claim 17 wherein a diameter of said cylindrical surface is equal to a diameter of said hemispherical surface.

20. An apparatus for forming a vortex comprising:

a member having a cavity therein, said member including an outer surface wherein said cavity communicates with said outer surface to form an opening, such that said vortex is formed within said cavity and exits said cavity through said opening;

said cavity further defining a surface and said member having a passageway therein, wherein said passageway intersects with said surface to form an inlet port at the intersection of said surface and said passageway;

said surface of said cavity including a diffuser surface and a stabilizer surface, said stabilizer surface positioned adjacent said diffuser surface such that said vortex is formed by contact of a fluid with said diffuser surface and is stabilized by said stabilizer surface prior to exiting the cavity through the opening adjacent said outer surface; and said diffuser surface is of a contour such that a fluid entering said cavity through said inlet port and striking said diffuser surface is redirected by said diffuser surface to include both a rotational component and an axial component.

* * * * *

UNITED STATES PATENT AND TRADEMARK OFFICE
CERTIFICATE OF CORRECTION

PATENT NO. : 5,687,766
DATED : November 18, 1997
INVENTOR(S) : Todd S. Weakley

It is certified that error appears in the above-indentified patent and that said Letters Patent is hereby corrected as shown below:

Column 1, line 26, "mount" should be -- amount --.

Column 5, Claim 12, line 61, "pen" should be -- port --.

Signed and Sealed this

Tenth Day of February, 1998

*Attest:*

*Attesting Officer*

BRUCE LEHMAN

*Commissioner of Patents and Trademarks*